(12) United States Patent
Everett et al.

(10) Patent No.: US 8,151,198 B2
(45) Date of Patent: Apr. 3, 2012

(54) SYSTEM AND METHOD FOR ITEM-BASED ECONOMY IN A VIRTUAL WORLD

(75) Inventors: Jason Everett, Calabasas, CA (US); Allan Jones, Valencia, CA (US); Jesse Schell, Carnegie, PA (US); Richard Colvin, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 539 days.

(21) Appl. No.: 12/387,267

(22) Filed: Apr. 29, 2009

(65) Prior Publication Data
US 2010/0280919 A1 Nov. 4, 2010

(51) Int. Cl.
*G06F 3/048* (2006.01)
*G06Q 30/00* (2006.01)

(52) U.S. Cl. ......... 715/757; 715/764; 705/27.1; 705/35; 463/1

(58) Field of Classification Search .................. 235/376, 235/385; 705/26.1, 27.1, 35, 36, 37; 715/757, 715/764; 463/1, 42, 43
See application file for complete search history.

(56) References Cited

U.S. PATENT DOCUMENTS

| | | | | |
|---|---|---|---|---|
| 6,085,164 A * | 7/2000 | Smith et al. | ....................... | 705/5 |
| 7,143,358 B1* | 11/2006 | Yuen | .............................. | 715/757 |
| 7,713,116 B2* | 5/2010 | Keam et al. | ....................... | 463/1 |
| 7,720,733 B2* | 5/2010 | Jung et al. | ........................ | 705/35 |
| 7,937,314 B2* | 5/2011 | Jung et al. | ........................ | 705/37 |
| 7,954,711 B2* | 6/2011 | Adstedt et al. | ................ | 235/385 |
| 8,060,571 B2* | 11/2011 | Rao | ............................... | 709/206 |
| 8,060,829 B2* | 11/2011 | Jung et al. | ........................ | 715/757 |
| 8,073,778 B2* | 12/2011 | Williams et al. | ................ | 705/51 |
| 2007/0203725 A1* | 8/2007 | Jung et al. | ......................... | 705/1 |
| 2008/0065514 A1* | 3/2008 | Eaton | ............................... | 705/27 |
| 2009/0043683 A1* | 2/2009 | Jung et al. | ....................... | 705/35 |
| 2010/0050100 A1* | 2/2010 | Dettinger et al. | ............. | 715/764 |

* cited by examiner

*Primary Examiner* — Andrew Joseph Rudy
(74) *Attorney, Agent, or Firm* — Farjami & Farjami LLP

(57) ABSTRACT

There is provided a system and method for an item-based economy in a virtual world. There is provided a server for providing an item exchange for a virtual world lacking a common currency for item valuation, comprising a processor configured to receive a request from a client having an inventory to initiate the item exchange, present a user interface on a display of the client for the item exchange, receive a selection of either a second quantity of second items or a third quantity of third items for the item exchange from the client, remove from the inventory of the client a first quantity of tradable items defined by a first exchange value or a second exchange value based on the selection, and add the second quantity of second items or the third quantity of the third items to the inventory of the client based on the selection.

20 Claims, 4 Drawing Sheets

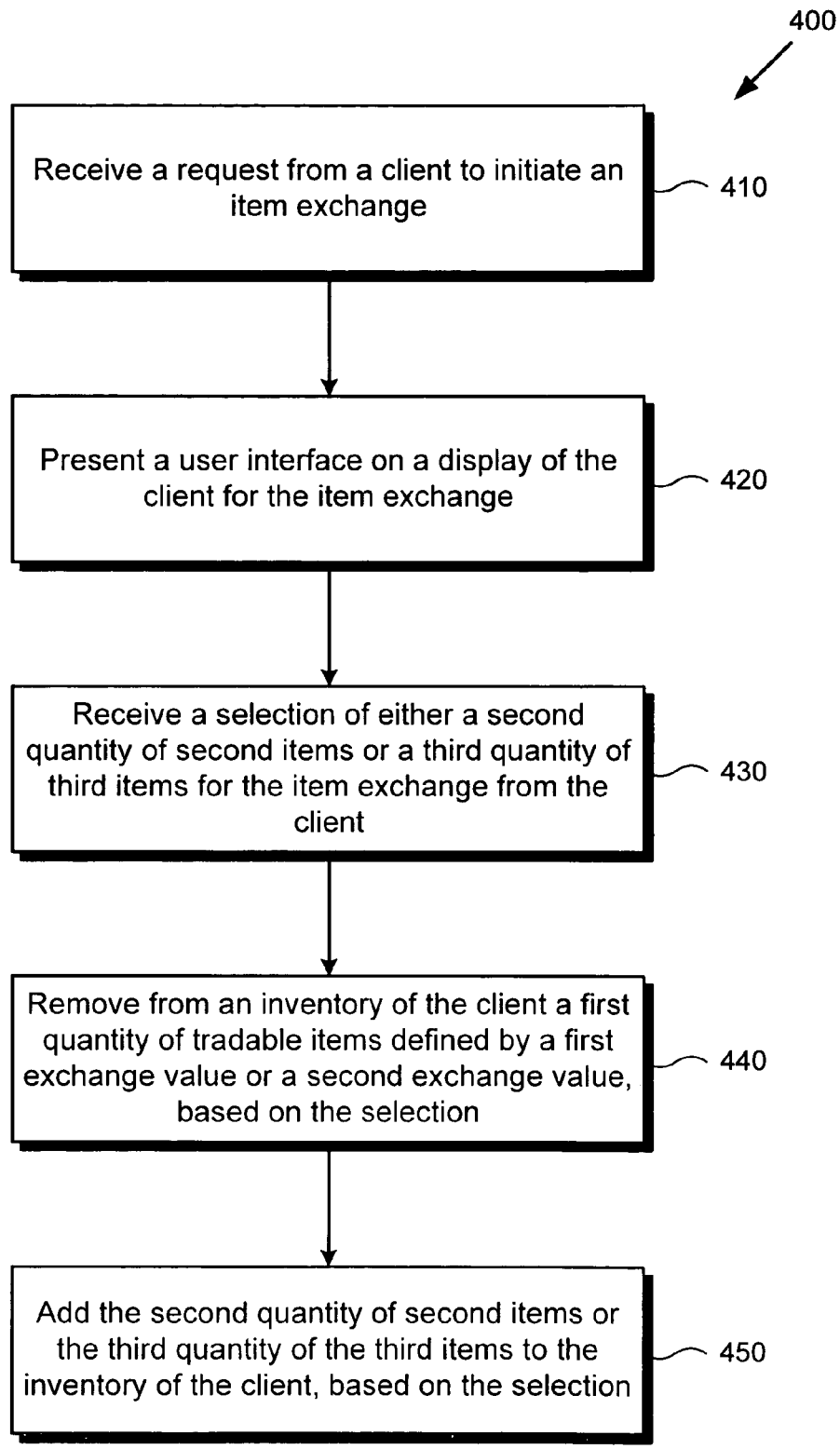

SYSTEM AND METHOD FOR ITEM-BASED ECONOMY IN A VIRTUAL WORLD

BACKGROUND OF THE INVENTION

1. Field of the Invention

The present invention relates generally to virtual worlds. More particularly, the present invention relates to economy in virtual worlds.

2. Background Art

Online virtual worlds allow users to explore exciting new settings and to enjoy fantasy worlds with settings far removed from everyday life. Whether visiting past or future settings, alternative dimensions or alternative histories, virtual worlds allow user to play out various "what if" scenarios and to experience a reality very different from their own. By visiting these virtual worlds, users can transport themselves to worlds defined by rules and logic that may not exist in the real world.

Besides virtual worlds, other online services such as auction sites, e-commerce merchants, web currency, and online classifieds can provide useful resources for many users. However, since these online services tend to be based on real money currency transactions, they may be less applicable for certain population segments. For example, younger users may see little use for many of these services, as they may require a credit card, bank account, or another account that may have limited eligibility for younger applicants. Moreover, as younger users may have little disposable income, the value of such online services based on real money currency transactions may be further reduced.

Virtual worlds tend to adopt similar currency transaction based economic conventions as well. In many virtual worlds, virtual items, characters, and other valuable virtual properties are purchased and traded with virtual currency transactions. Besides obtaining virtual currency through actions carried out in the virtual worlds, users may also obtain virtual currency through real money transactions, exchanging real world currency for virtual currency. Some virtual worlds may condone these real money transactions and facilitate their completion, whereas other virtual worlds may discourage such transactions to foster a sense of egalitarianism. In either case, these real money transactions will nevertheless tend to occur in virtual worlds with sufficiently compelling content. As a result, these virtual worlds may retain many of the drawbacks of real world economies, including inflation and exchange rate fluctuations.

However, since virtual worlds are available to a global audience and are not restricted by the limitations of real world economies, there is no reason for virtual worlds to solely adopt such currency-based economic systems. While it may be convenient and familiar for developers to model virtual economies similarly to real world economies, such a pairing may not effectively leverage the unlimited possibilities provided by virtual worlds. In particular, users from the younger generation may be better served by new virtual economic paradigms that are more inclusive and less focused on real money transactions.

Accordingly, there is a need to overcome the drawbacks and deficiencies in the art by providing a new way to define virtual transactions for virtual worlds.

SUMMARY OF THE INVENTION

There are provided systems and methods for an item-based economy in a virtual world, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a server can provide an item exchange for a virtual world lacking a common currency for item valuation.

DETAILED DESCRIPTION OF THE INVENTION

The present application is directed to a system and method for an item-based economy in a virtual world. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
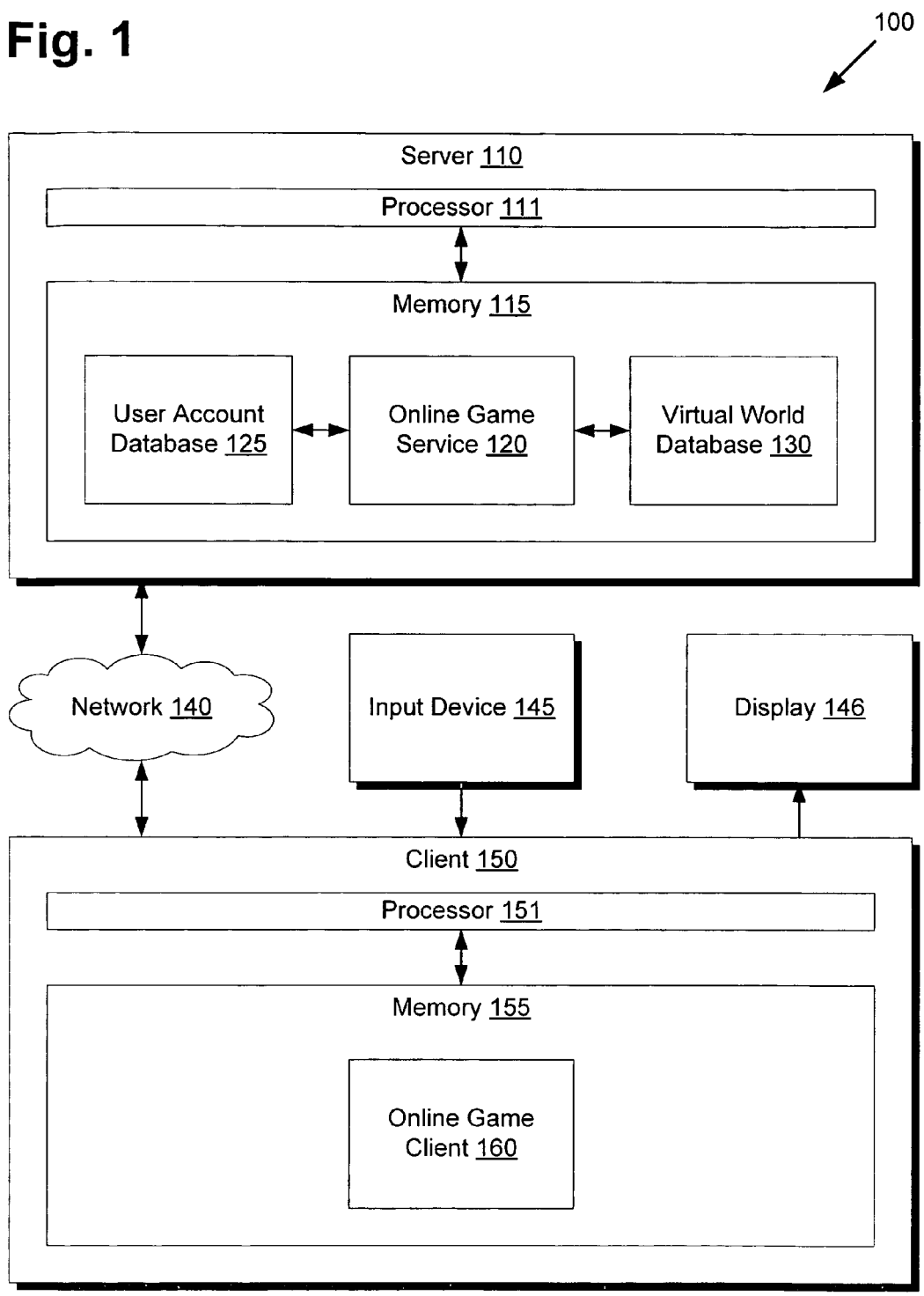
FIG. 1 presents a block diagram of a system for supporting an item-based economy in a virtual world, according to one embodiment of the present invention.

FIG. 1 presents a block diagram of a system for supporting an item-based economy in a virtual world, according to one embodiment of the present invention. Environment 100 of FIG. 1 includes server 110, network 140, input device 145, display 146, and client 150. Server 110 includes processor 111 and memory 115. Memory 115 includes online game service 120, user account database 125, and virtual world database 130. Client 150 includes processor 151 and memory 155. Memory 155 includes online game client 160.

Processor 111 of server 110 may execute online game service 120 stored in memory 115 to provide an online virtual world accessible by client 150 through network 140. For simplicity, only a single server 110 and a single client 150 are depicted in environment 100 of FIG. 1, but alternative embodiments may deploy multiple servers for load balancing and enhanced availability, and multiple clients may be connected to support a massively multiplayer online virtual world. Alternative data structures may also be used in conjunction with or in lieu of the databases shown in memory 115 for speed optimization or complexity management reasons. For example, some data stores may be more readily and quickly implemented through a simple matrix array or linked list, rather than a fully featured database that may require high overhead. Additionally, database components may be modularized to several servers. For example, one dedicated server may host only virtual world database 130, while another dedicated server may host only user account database 125, and yet another dedicated server may host only online game service 120.

Online game service 120 may comprise, for example, an executable program that can authenticate client 150 over network 140 by checking provided credentials against user account database 125. User account database 125 may store a variety of data for each client registered for the virtual world, such as login and password, game state, activity history, and other data. After authentication, online game service 120 may consult virtual world database 130 to retrieve parts of the virtual world currently relevant to the user account retrieved from user account database 125.

For example, if the user of client 150 last logged off while shopping in a town, data from virtual world database 130 may be retrieved pertaining to that town, including map data and rendering assets. Additionally, online game service 120 can check if other clients within user account database 125 are also located within the same town to provide player interactions accordingly, such as displaying their avatars and enabling group chat with fellow players. This retrieved data can then be provided to client 150 over network 140, which may comprise a publicly accessible network such as the Internet, or a private network such as a local area network or a mobile broadband network.

Meanwhile, processor 151 of client 150 may execute online game client 160 in memory 155, which may have been previously downloaded or installed to client 150 from physical media. Online game client 160 provides the means to communicate with online game service 120 via network 140, receive inputs from input device 145, and output images to display 146, thereby providing an online virtual world experience. For example, client 150 may comprise a personal computer, game console, mobile Internet device (MID), notebook or laptop computer, or another interactive device for use by the user or player. Online game client 160 may comprise a native executable or bytecode to be interpreted by a web browser plug-in such as Java or Flash. Input device 145 may comprise a keyboard, mouse, gamepad, touchscreen, or other input device. Display 146 may comprise a computer monitor, a television, or a high definition television (HDTV) using cathode ray tube (CRT), plasma, liquid crystal display (LCD), or another display technology.

Figure 2:
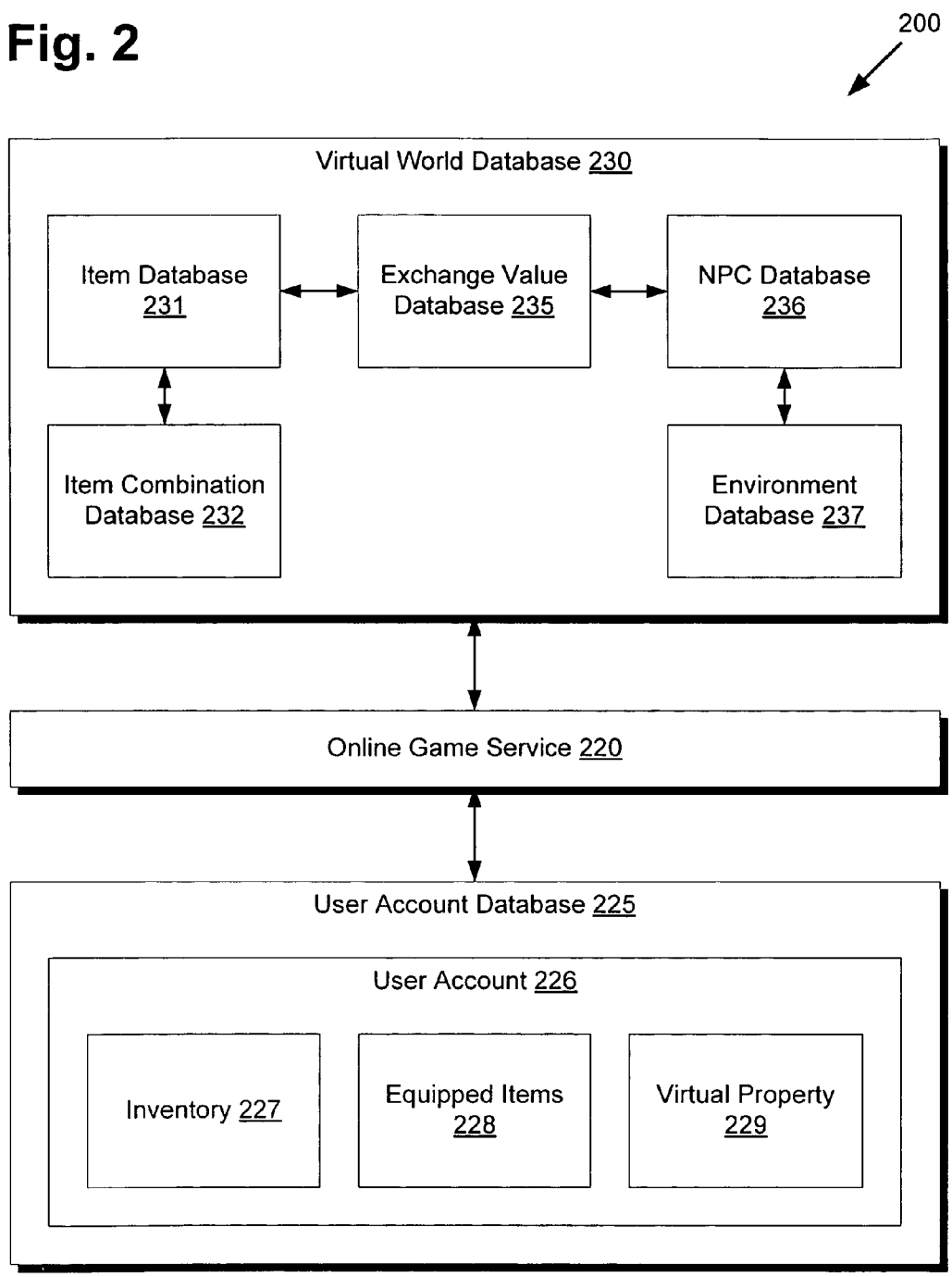
FIG. 2 presents a block diagram of a server for supporting an item-based economy in a virtual world, according to one embodiment of the present invention.

FIG. 2 presents a block diagram of a server memory for supporting an item-based economy in a virtual world, according to one embodiment of the present invention. Server memory 200 includes online game service 220, user account database 225, and virtual world database 230. User account database 225 includes user account 226. Virtual world database 230 includes item database 231, item combination database 232, exchange value database 235, non-player character (NPC) database 236, and environment database 237. With regards to FIG. 2, it should be noted that online game service 220 corresponds to online game service 120 from FIG. 1, that user account database 225 corresponds to user account database 125 from FIG. 1, and that virtual world database 230 corresponds to virtual world database 130 from FIG. 1.

Server memory 200 shows in greater detail some exemplary components that may be stored in memory 115 of server 110 in FIG. 1. In particular, components supporting an item-based economy are shown by server memory 200 of FIG. 2. Virtual world database 230 includes several item related components, including item database 231, item combination database 232, and exchange value database 235. Item database 231 may contain, for example, records for every possible item in the virtual world, describing the characteristics of each item, their visual appearance, and other relevant data. Item combination database 232 may then define the different ways in which the items referenced in item database 231 can be combined to create new items. For example, the virtual world may offer various ways to combine items, such as character skills, jobs, alchemy, cooking, crafting, weaving, and other features that take one or more "tradable" items that can be transformed into a new item. The term "tradable" is used here in the sense that these items can be transformed into a new item, and not necessarily that they must be used in a bartering transaction. Item combination database 232 can store records defining all possible combinations from the various skills and items available to users of the virtual worlds.

Additionally, exchange value database 235 may store records pertaining to item valuations, where items have exchange values defined by quantities of items, rather than a common currency, such as money, gold or any other single item. In this manner, players and non-player characters (NPCs) can exchange items with each other even without a common currency such as money or gold. NPCs might comprise shopkeepers, virtual world citizens, and other characters that are not directly controlled by users but may respond to users through artificial intelligence algorithms of online game service 220.

Moreover, item valuations may be specific to particular characters in the virtual world, where different characters may place different values on different items. For example, one non-player character (NPC) may particularly value high quality fruit, and may offer rare and desirable items in exchange for high quality fruit. Another NPC may dislike fruit and refuse to even trade for fruit, or may offer only token items for trade, like a type of flower easily found throughout the wilderness of the virtual world. NPC database 236 in conjunction with exchange value database 235 can store these and other NPC exchange value preferences to provide a more realistic item-based economy for the virtual world.

Moreover, these exchange values may dynamically change in response to conditions of the virtual world, such as reaching a predetermined date and/or time. For example, a processor of a server may implement behaviors where certain NPCs may offer discounts activated by particular days of the week, or a food vendor NPC may offer happy hour discounts at particular hours of the day. Larger events in the virtual world, like an annual festival, might trigger NPCs to provide discounts or festive items instead of their usual inventory. Seasonally available items, such as flowers that bloom only during the spring season, may replace other items as exchange values during the relevant season.

Additionally, clients may have inventories comprising a subset of items from a finite global inventory, introducing item scarcity into the virtual world economy. NPCs may thus adjust exchange values according to supply and demand or other factors, depending on the personality of the NPC. Environment database 237 may provide a repository for the finite global inventory, providing a geographic layout of the virtual world along with placement of items, buildings, structures, NPCs, and other features.

While virtual world database 230 may focus on data regarding the virtual world, user account database 225 may focus on data regarding user accounts. Besides containing authentication information, each user account may contain information regarding the user's status and relationship with the virtual world. Although only a single user account 226 is shown in server memory 200 of FIG. 2, alternative embodiments may include several user accounts within user account database 225 to support massively multiplayer worlds. Although clients may partially cache the data contained in user account database 225, user account database 225 might also be used as a master store to override local client data in situations where network disconnections or data discrepancies occur, preventing unauthorized data changes and other unwanted side effects. In this way, user account 226 of an associated client including inventory 227 may be stored on the server side, such as server 110 of FIG. 1, where the memory on the client side is used primarily for holding temporary caching data.

Examining user account 226, inventory 227 may contain a list of items carried by a client associated with user account 226, equipped items 228 may indicate a list of items currently worn or used by an avatar associated with the client, and virtual property 229 may list areas and buildings for which user account 226 can claim private ownership within environment database 237. By examining equipped items 228, online game service 220 can properly render an avatar associated with user account 226. For example, if equipped items 228 indicates that various avatar wearable components such as a green hat, a blue cape, and a red rod are worn on the user's avatar, then online game service 220 executing on a processor of a server can send a depiction of the avatar on a display of the client associated with user account 226, where the green hat is shown on top of the avatar's head, the blue cape flutters behind the avatar in the wind, and the red rod is grasped in the right hand of the avatar. This depiction can then be processed by a program on the client side, such as online game client 160 of FIG. 1, to output to a display such as display 146, for viewing by the user. As the client creates or trades for more avatar wearable components, the client may mix and match avatar wearable components to create an avatar appearance suiting the user's personality and tastes.

Besides an avatar of the client, furnishings and accessories might also be rendered for virtual properties owned by the client. For example, virtual property 229 might indicate that the client owns a small house within a city, including a wooden table and a leather sofa. If the client returns to visit the small house in the city, a processor running online game service 220 may send a depiction of the small house with the wooden table and the leather sofa to the program on the client side for outputting to a display of the client. As the client creates or trades for additional furnishings, the client may request to place the additional furnishings in the virtual property, decorating the virtual property according to personal taste.

Figure 3:
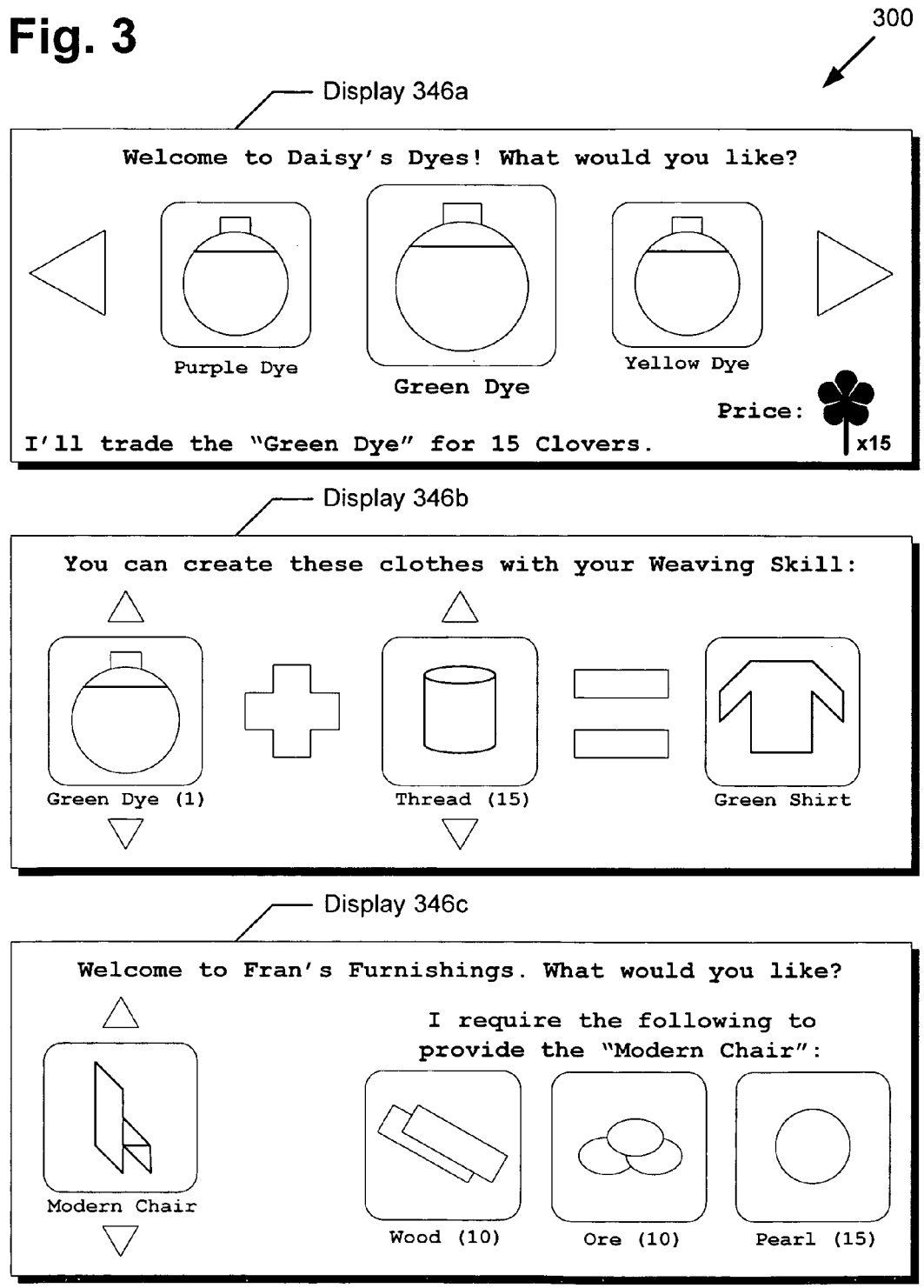
FIG. 3 presents exemplary user interfaces for interacting with an item-based economy in a virtual world, according to one embodiment of the present invention.

FIG. 3 presents exemplary user interfaces for interacting with an item-based economy in a virtual world, according to one embodiment of the present invention. Diagram 300 of FIG. 3 includes displays 346a-346c. With regards to FIG. 3, it should be noted that displays 346a-346c correspond to display 146 from FIG. 1.

Display 346a shows a user interface where a client requests an item exchange or barter with a NPC of the virtual world, Daisy, who owns a storefront called "Daisy's Dyes." Daisy's inventory of bottled colored dyes is navigable through a user interface shown on display 346a, where the client can scroll left and right to browse Daisy's inventory. As shown by display 346a, a first quantity of tradable items or "15 Clovers" is quoted for a first exchange value, which is also defined by a second quantity of second items, or a single bottle of "Green Dye." Additionally, although not shown in display 346a, if the client selects "Yellow Dye" for example, Daisy may instead quote a first quantity of tradable items as "20 Buttercup Blossoms" for a single bottle of "Yellow Dye." In this manner, an alternative first quantity of "20 Buttercup Blossoms" has a second exchange value defined by a third quantity of third items, or a single bottle of "Yellow Dye." Meanwhile, Daisy might request a different first quantity of tradable items for the "Purple Dye," such as "10 Plums." In this manner, the virtual world can support an item-based economy even without a common currency. Although the item exchanges used for the user interface of display 346a focus on single item type exchanges, alternative embodiments may include several different tradable items and exchange values with several different types of items.

As previously discussed, a processor of a server supporting the virtual world may define exchange values on a global scale, or may be define exchange values as particular to individual NPCs of the virtual world. For example, the first exchange value and the second exchange value offered by Daisy may be defined as specific to Daisy herself, and other NPCs may offer to trade for a different quantity of tradable items even with the same bottle of dye. For example, in a remote area where bottled dyes and their constituent ingredients are difficult to procure, NPCs may be less willing to trade bottled dyes and may demand a larger quantity of items or rarer and more difficult to obtain items. Additionally, as previously discussed, NPC personalities, virtual world economics, timed events, and other factors may also influence NPC item valuations to provide a more realistic item-based economy. Since these factors may evolve and change over time, item valuations and their corresponding exchange values may be defined by fluctuating quantities of different items at different times. Administrators may also manually change item valuations to address economic or game imbalances and to improve the user experience.

Display 346b shows a user interface where a client commands the use of a "Weaving" skill to create a new combination item, wherein the user interface presents a list of combination items possible from an inventory of the client. As previously discussed, other character skills and jobs such as alchemy, cooking, and crafting may also be used to create new combination items. As shown by the user interface of display 346b, the client can select two items from the inventory of the client to "weave" a new item. The example shown in display 346b provides the combination where one bottle of "Green Dye" is combined with 15 units of "Thread" to weave a single "Green Shirt." Although the example given in display 346b only has two types of items in the combination, alternative embodiments may use several different types of items for more complicated combinations. Moreover, the resulting item might depend on other variables, such as the client's level of weaving skill. For example, a low level weaving skill might result in a plain shirt, whereas a high level weaving skill might result in an enchanted shirt with special beneficial properties. One the avatar wearable clothes are created using the weaving skill, the user interface might prompt the client whether to don the newly created clothes. If the user decides to wear the newly created clothes, then a depiction of the user's avatar may change correspondingly on a display of the client. For example, the "Green Shirt" may look like a simple green shirt, whereas an enchanted shirt might glow and sparkle onscreen to indicate its beneficial properties.

Display 346c shows a user interface where a client requests an item exchange or barter with a NPC of the virtual world, Fran, who owns a storefront called "Fran's Furnishings." In contrast to Daisy's Dyes depicted in display 346c, Fran asks for several different tradable item types rather than a single tradable item type in exchange for a second item comprising a single "Modern Chair." These tradable items include 10 boards of Wood, 10 lumps of Ore, and 15 Pearls. These items might be scattered throughout the virtual world for users to gather, mine, and collect, and trade. Once enough tradable items are gathered, a client can exchange the tradable items for furniture at Fran's Furnishings for decorating virtual property. For example, after purchasing the "Modern Chair" by providing the requested items, the "Modern Chair" may be placed in the small house in the city owned by the client. The next time the client decides to visit the house, a processor of the server may provide a depiction of the house with the "Modern Chair" in addition to the already existing leather sofa and wooden table, which can then be sent to a client program for displaying on a display of the client. In this manner, the client can engage in economic transactions transforming the visual perception of the virtual world through the client without the use of a common currency such as money or gold for item valuation.

FIG. 4 shows a flowchart describing the steps, according to one embodiment of the present invention, by which a server can provide an item exchange for a virtual world lacking a common currency for item valuation. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 111 of server 110 executing online game service 120 receiving a request from processor 151 of client 150 executing online game client 160 to initiate an item exchange. The exchange previously explained in conjunction with display 346a of FIG. 3 will be used as an example to illustrate steps 410 through 450 of flowchart 400. Thus, the request of step 410 comprises a request to initiate an item exchange or barter with the NPC "Daisy" of the storefront "Daisy's Dyes" within a virtual world supported by game service 120. As previously discussed, user account database 125 and virtual world database 130 provide resources for use by game service 120 to provide the virtual world to online game client 160 for rendering on display 146. User input from input device 145 detected by online game client 160 may provide the user input action for initiating step 410, for example by a user input comprising clicking on a depiction of Daisy on display 146.

Referring to step 420 of flowchart 400 in FIG. 4 and environment 100 of FIG. 1, step 420 of flowchart 400 comprises processor 111 of server 110 presenting a user interface on display 146 of client 150 for the item exchange requested in step 410, which corresponds to display 346a of FIG. 3. As previously discussed, the user interface shown in display 346a allows client 150 to browse through Daisy's inventory for item exchange or bartering. As with step 410, input device 145 may be used in conjunction with online game client 160 to provide user input for interpretation by online game service 120 running on processor 111 of server 110.

Referring to step 430 of flowchart 400 in FIG. 4 and environment 100 of FIG. 1, step 430 of flowchart 400 comprises processor 111 of server 110 receiving a selection of either a bottle of green dye or a bottle of yellow dye for the item exchange depicted by the user interface of step 420 from client 150. As previously, input device 145 may be used in conjunction with online game client 160 request user input for the selection. Once a user of client 150 indicates the desired selection by clicking on a desired bottle for example, the selection may then be sent to processor 111 of server 110 through network 140 for receiving and further processing. For the purposes of the present example, it might be assumed that the user of client 150 selects the "Green Dye" depicted in display 346a of FIG. 3.

Referring to step 440 of flowchart 400 in FIG. 4, environment 100 of FIG. 1, and server memory 200 of FIG. 2, step 440 of flowchart 400 comprises processor 111 of server 110 removing from inventory 227 of client 150 a first quantity of tradable items defined by an exchange value based on the selection of step 430. To determine the exchange value, exchange value database 235 and NPC database 236 may be referenced to determine the first quantity of tradable items Daisy is willing to trade for the requested bottle of "Green Dye" from step 430. As previously discussed, if player skills such as weaving or crafting are utilized instead of NPC bartering for the item exchange request, then other data sources such as item combination database 232 and environment database 237 may be consulted instead.

According to the results shown on display 346a of FIG. 3, this first quantity of tradable items includes "15 Clovers." However, if the user selected the "Yellow Dye" instead in step 430, then step 440 may result in a first quantity of tradable items including "20 Buttercup Blossoms" as previously stipulated. Alternatively, if the user selected the "Purple Dye" instead in step 430, then step 440 may result in a first quantity of tradable items including "10 Plums." Thus, assuming that the "Green Dye" is selected in step 430, then 15 Clovers are removed from inventory 227 in step 440, where user account 226 corresponds to an account of client 150 of FIG. 1.

Referring to step 450 of flowchart 400 in FIG. 4, environment 100 of FIG. 1, and server memory 200 of FIG. 2, step 440 of flowchart 400 comprises processor 111 of server 110 adding to inventory 227 of client 150 the items defined by the selection from step 430. Since the "Green Dye" was selected in step 430, one bottle of "Green Dye" may be added to inventory 227 in step 450, thus completing the virtual world transaction without ever needing to use a common currency.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A server providing an item exchange for a virtual world lacking a common currency for item valuation, the server comprising:

a processor configured to:

receive a request from a client to initiate the item exchange, the client having an inventory including a first quantity of tradable items, wherein the first quantity of tradable items has a first exchange value defined by a second quantity of second items and has a second exchange value defined by a third quantity of third items;

present a user interface on a display of the client for the item exchange;

receive a selection of either the second quantity of second items or the third quantity of third items for the item exchange from the client;

remove from the inventory of the client the first quantity of tradable items defined by the first exchange value or the second exchange value, based on the selection; and add the second quantity of second items or the third quantity of the third items to the inventory of the client, based on the selection.

2. The server of claim 1 further comprising a memory storing the inventory of the client.

3. The server of claim 1, wherein the selection comprises an avatar wearable component, and wherein processor is further configured to:

receive a request from the client to wear the avatar wearable component on an avatar of the client; and present a depiction of the avatar of the client on the display of the client, wherein the depiction includes the avatar wearable component.

4. The server of claim 1, wherein the selection comprises a furnishing, and wherein the processor is further configured to:

receive a request from the client to place the furnishing on a virtual property of the client; and present a depiction of the virtual property on the display of the client, wherein the depiction includes the furnishing.

5. The server of claim 1, wherein the processor is further configured to:

change the second quantity of second items defined by the first exchange value dynamically in response to a condition of the virtual world.

6. The server of claim 5, wherein the condition of the virtual world comprises reaching a predetermined time.

7. The server of claim 1, wherein the inventory of the client comprises a subset of items from a finite global inventory.

8. The server of claim 1, wherein the request from the client comprises a request to barter with a non-player character (NPC) of the virtual world, and wherein the user interface presents an inventory of the NPC.

9. The server of claim 8 wherein prior to receiving the request the processor is further configured to determine the first exchange value and the second exchange value using the NPC.

10. The server of claim 1, wherein the request from the client comprises a command to combine items to create a new combination item, and wherein the user interface presents a list of combination items possible from the inventory of the client.

11. The server of claim 10, wherein the list of combination items possible is affected by a parameter of the client.

12. The server of claim 10, wherein the command comprises a use of a crafting skill.

13. A method for use by a server to provide an item exchange for a virtual world lacking a common currency for item valuation, the method comprising:

receiving a request from a client to initiate the item exchange, the client having an inventory including a first quantity of tradable items, wherein the first quantity of tradable items has a first exchange value defined by a second quantity of second items and has a second exchange value defined by a third quantity of third items;

presenting a user interface on a display of the client for the item exchange;

receiving a selection of either the second quantity of second items or the third quantity of third items for the item exchange from the client;

removing from the inventory of the client the first quantity of tradable items defined by the first exchange value or the second exchange value, based on the selection; and adding the second quantity of second items or the third quantity of the third items to the inventory of the client, based on the selection.

14. The method of claim 13, further comprising:

receiving a request from the client to wear the selection on an avatar of the client, wherein the selection comprises an avatar wearable component; and presenting a depiction of the avatar of the client on the display of the client, wherein the depiction includes the avatar wearable component.

15. The method of claim 13, further comprising:

receiving a request from the client to place the selection on a virtual property of the client, wherein the selection comprises a furnishing; and presenting a depiction of the virtual property on the display of the client, wherein the depiction includes the furnishing.

16. The method of claim 13, further comprising:

changing the second quantity of second items defined by the first exchange value dynamically in response to a condition of the virtual world.

17. The method of claim 16, wherein the condition of the virtual world comprises reaching a predetermined time.

18. The method of claim 13, wherein the receiving the request from the client comprises receiving a request to barter with a non-player character (NPC) of the virtual world, and wherein the user interface presents an inventory of the NPC.

19. The method of claim 18, further comprising prior to receiving the request determining the first exchange value and the second exchange value using the NPC.

20. The method of claim 13, wherein the receiving the request from the client comprises receiving a command to combine items to create a new item, and wherein the user interface presents a list of combination items possible from the inventory of the client.

* * * * *